E. J. TAYLOR.
MOLD AND PROCESS FOR FORMING PORCELAIN INSULATORS THEREIN.
APPLICATION FILED AUG. 9, 1919.

1,351,929.

Patented Sept. 7, 1920.

Inventor:
Ernest J. Taylor,
by his atty

UNITED STATES PATENT OFFICE.

ERNEST J. TAYLOR, OF EVERETT, MASSACHUSETTS.

MOLD AND PROCESS FOR FORMING PORCELAIN INSULATORS THEREIN.

1,351,929.  Specification of Letters Patent.  Patented Sept. 7, 1920.

Application filed August 9, 1919. Serial No. 316,366.

*To all whom it may concern:*

Be it known that I, ERNEST J. TAYLOR, a citizen of the United States, residing at Everett, in the county of Middlesex and State of Massachusetts, have invented new and useful Improvements in Molds and Processes for Forming Porcelain Insulators Therein, of which the following is a specification.

This invention relates to molds and to the method of forming porcelain insulators for spark plugs by means of said molds.

It is the object of the invention to provide a mold in which clay in a plastic state may be placed and formed into insulators, the said insulators being absolutely smooth and free from internal strains which tend to cause distortion and cracks when the insulators are later removed from the mold and baked in a kiln.

So far as I am aware up to the present time porcelain insulators for spark plugs have always been formed in split molds and by applying the pressure to the clay laterally of the insulator. This method of forming the insulator has proved unsatisfactory as there is a large percentage of loss caused by imperfections. These imperfections result from various causes.

In a split side-pressure mold it is impossible to mold an insulator without forming a thin fin between the adjacent faces of the mold and when this is removed it results in a rough line on the completed porcelain insulator. Furthermore, if an insulator upon being removed from a side-pressure mold is found to be slightly out of alinement and has to be straightened, or if there have been rough places upon its surface prior to being placed in the kiln, even though the insulator has been ground smooth, when the insulator is subsequently baked said insulator will return to its former distorted position and the roughness and other inequalities will reappear.

It is an object, therefore, of this invention to so construct the mold that the pressure upon the clay will be applied endwise of the molded clay, the result being that said molded clay may be removed from the mold free from roughness or internal strains of any kind so that the finished article when baked will be perfect.

The invention consists in the combination and arrangement of parts set forth in the following specification and particularly pointed out in the claims thereof.

Referring to the drawings.

Like numerals refer to like parts throughout the several views of the drawings.

Figure 1:
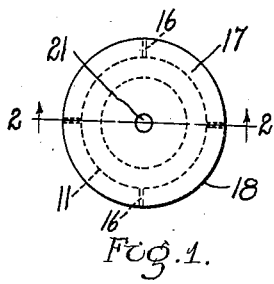
Figure 1 is a plan view of my improved mold.
Figure 3:
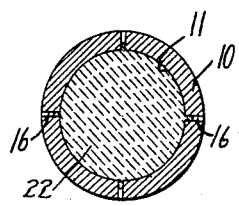
Fig. 3 is a horizontal section taken on the line 3—3 of Fig. 2.

In the drawings, Figs. 1 to 4 inclusive, 10 represents the main body portion of a mold, the same being constructed in one piece from any suitable material preferably metal. The upper part of the body portion 10 has a cylindrical bore 11 which corresponds to the diameter of the central portion of an insulator 12. At its lower end the cylindrical bore 11 terminates in a recess 13 which conforms to the shape of an end portion 14 of the insulator 12. An opening 15 extends through the lower end of the body portion 10 of the mold and communicates with the recess 13, said opening constituting an air vent, an outlet for the excess of clay 22, and also a means whereby a rod may be inserted, as will hereinafter be more fully explained. A plurality of other openings 16 communicate with the interior of the body portion 10 and also constitute air vents and outlets for the excess of clay 22.

A plunger 17 is adapted to fit the bore 11 of the body portion 10 and slide vertically therein, the downward movement of said plunger 17 in said body portion being limited by a flange 18 which engages the upper end of said body portion. The plunger 17 is provided with a recess 19 which conforms to the shape of an end portion of the insulator 12. The plunger 17 is also provided with an opening 21 which communicates with the recess 19 and also constitutes an air vent and an outlet for the excess of clay 22. The opening 21 is in alinement with the opening 15 both being concentric with the median axial line of the mold.

The operation of my improved mold is as follows: A quantity of clay 22 in plastic state is placed in the bore 11 of the main body portion 10 of the mold. The quantity of clay should be somewhat in excess of the exact amount required. The plunger 17 is then inserted within the bore 11 and pushed into contact with the clay 22. The mold is then placed under a suitable press and the plunger 17 is forced downwardly until the flange 18 engages the top of the main body portion 10 at which time the entire cavity upon the interior of the mold should be solidly filled, any excess of clay having been forced outwardly through the openings 15, 16 or 21. The air also within the interior of the mold is forced outwardly through the same openings.

Figure 2:
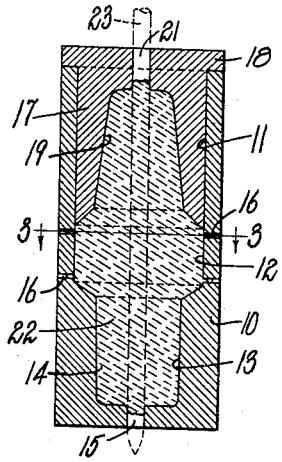
Fig. 2 is a vertical section taken on the line 2—2 of Fig. 1.
Figure 4:
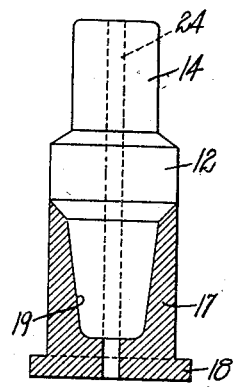
Fig. 4 is a view illustrating the manner of employing the vertical slidable member of the mold as a support for the molded clay during the drying process prior to the baking.

The pressure upon the clay in forming the insulator is applied endwise of the insulator. After being removed from the press a rod 23, illustrated in dotted lines in Fig. 2, is inserted in either the opening 21 or the opening 15 and said rod is forced through the clay 22 and out through the opposite end of the mold. This will form a hole 24 which will extend entirely through the insulator. The mold is next placed in a warm location and the clay allowed to dry within the mold until said clay has shrunk sufficiently to be released from the inside surface of the mold. The position of the mold is then reversed from that illustrated in Fig. 2 and the plunger 17 withdrawn, the molded clay resting in the recess 19 of the plunger 17 as illustrated in Fig. 4. In this manner the molded clay may be removed from the main body portion 10 of the mold without injuring the same in any way. While resting in the plunger 17 the molded clay is allowed to dry until it can be safely handled when it is removed from the plunger 17 and placed in a kiln and baked. Clay molded and dried in this manner will not crack or become distorted as is the case when the pressure is applied from the side.

Figure 5:
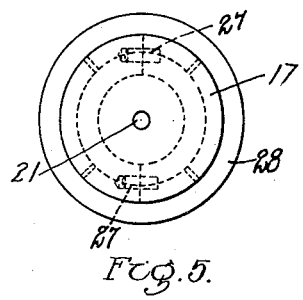
Fig. 5 is a plan view of a modified construction of mold embodying my invention.
Figure 6:
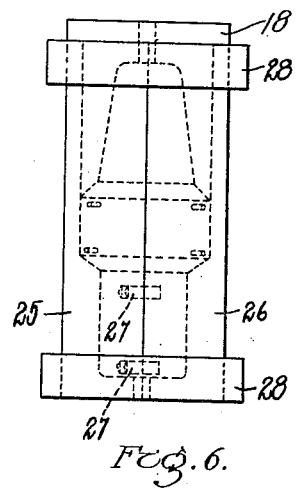
Fig. 6 is a front elevation of the same.

In Figs. 5 and 6 I have illustrated another embodiment of my invention. In this embodiment the main body portion of the mold is constructed in two parts 25 and 26, said parts being positioned relatively to each other by dowels 27 and held together by a pair of rings 28. In other respects the mold illustrated in Figs. 5 and 6 is exactly the same as the mold previously described and the method employed in molding clay therein is likewise exactly the same, except that in this form, the main body portion of the mold may be separated into two parts if desired by removing the rings 28.

Figure 8:
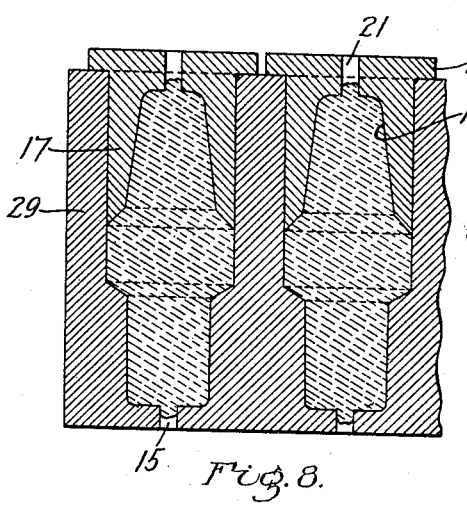
Fig. 8 is a vertical section taken on the line 8—8 of Fig. 7.
Figure 7:
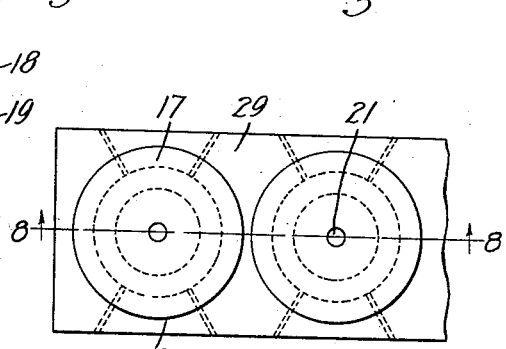
Fig. 7 is a plan view of still another embodiment of my invention.

In Figs. 7 and 8 I have illustrated still another embodiment of my invention wherein I have formed a multiple mold employing a single body portion 29. In other respects the mold is exactly the same as the mold illustrated and described in connection with Figs. 1 to 4 inclusive and the method employed in forming the insulator and drying the same is exactly the same as the method in the preferred embodiment of my invention.

It is also evident that a multiple mold may be constructed with a body portion formed in two separate parts suitably fastened together without departing from the spirit of my invention.

Having thus specifically described my invention what I claim and desire by Letters Patent to secure is:

1. A mold having, in combination, a main body portion, said main body portion being provided with a longitudinally extended bore and also being provided with vents, and a plunger adapted to slide within said bore and into endwise engagement with plastic material contained within said bore, whereby said material may be compressed endwise into a pre-determined shape, said plunger also being adapted to vertically position said compressed material and after the same has been removed from said mold.

2. A mold having, in combination, a main body portion, said main body portion being provided with a longitudinally extended bore and also being provided with vents, and a plunger having a recess in its forward end and adapted to slide within said bore and into endwise engagement with plastic material contained within said bore, whereby said material may be compressed endwise into a pre-determined shape and subsequently vertically positioned in the recessed end of said plunger after being removed from said bore.

3. The herein described method of forming insulators for spark plugs which consists in first inserting a mass of plastic material in a longitudinally extended bore provided in the main body portion of a mold, second, submitting said plastic mass to endwise pressure by means of a plunger which slidably fits said bore and has a recess in its forward end whereby said plastic mass may be compressed endwise within said bore and recess, and third, allowing said compressed mass to dry within said mold under the influence of heat applied to said mold.

4. The herein described method of forming insulators for spark plugs which consists in first inserting a mass of plastic material in a longitudinally extended bore provided in the main body portion of a mold, second, submitting said plastic mass to endwise pressure by means of a plunger which slidably fits said bore and has a recess in its forward end whereby said plastic mass may be compressed endwise within said bore and recess, third, allowing said compressed mass to partially dry within said mold under the influence of heat applied to said mold, and fourth, removing said plunger from the main body portion of said mold with the compressed mass retained in the recess in said plunger and allowing said compressed mass to dry still further while being supported within said recess in said plunger.

5. The herein described method of forming insulators for spark plugs which consists in first inserting a mass of plastic material in a longitudinally extended bore provided in the main body portion of a mold, said mold being provided with suitable vents, second, submitting said plastic mass to endwise pressure by means of a plunger which slidably fits said bore and has a recess in its forward end whereby said plastic mass may be compressed endwise within said bore and recess, the excess of plastic material escaping through said vents, third, allowing said compressed mass to partially dry within said mold under the influence of heat applied to said mold, and fourth, removing said plunger from the main body portion of said mold with the compressed mass retained in the recess in said plunger and allowing said compressed mass to dry still further while being supported within said recess in said plunger.

6. The herein described method of forming insulators for spark plugs which consists in first inserting a mass of plastic material in a longitudinally extended bore provided in the main body portion of a mold, said mold being provided with suitable vents, second, submitting said plastic mass to endwise pressure by means of a plunger which slidably fits said bore and has a recess in its forward end whereby said plastic mass may be compressed endwise within said bore and recess, the excess of plastic material escaping through said vents, third, forcing a rod through said compressed mass within said mold and removing the same, thereby forming a hole through said compressed mass, fourth, allowing said compressed mass to partially dry within said mold, and fifth, removing said plunger from the main body portion of said mold with the compressed mass retained in the recess in said plunger and allowing said compressed mass to dry still further while being supported within said recess in said plunger.

In testimony whereof I have hereunto set my hand in presence of two subscribing witnesses.

ERNEST J. TAYLOR.

Witnesses:
 FRANKLIN E. LOW,
 HERMAN R. HOFFMAN.